A. LUCAND.
FOUR-WHEEL BRAKE EQUALIZER.
APPLICATION FILED MAR. 10, 1920.
1,379,111.
Patented May 24, 1921.
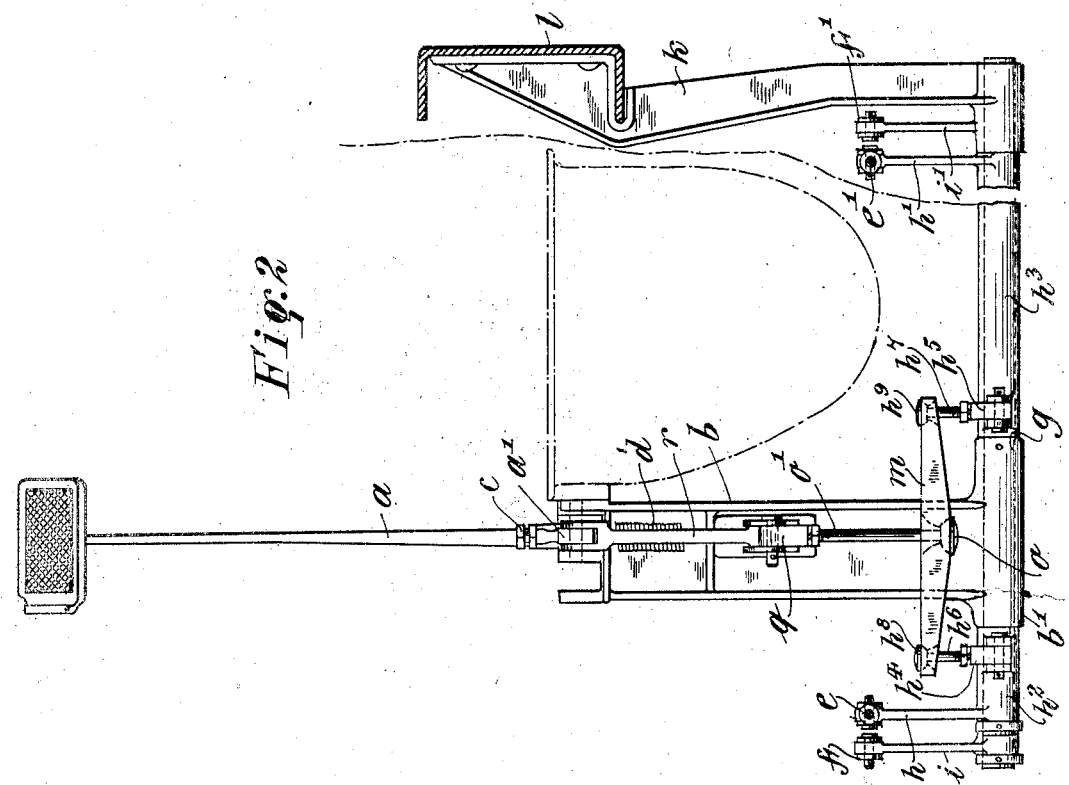
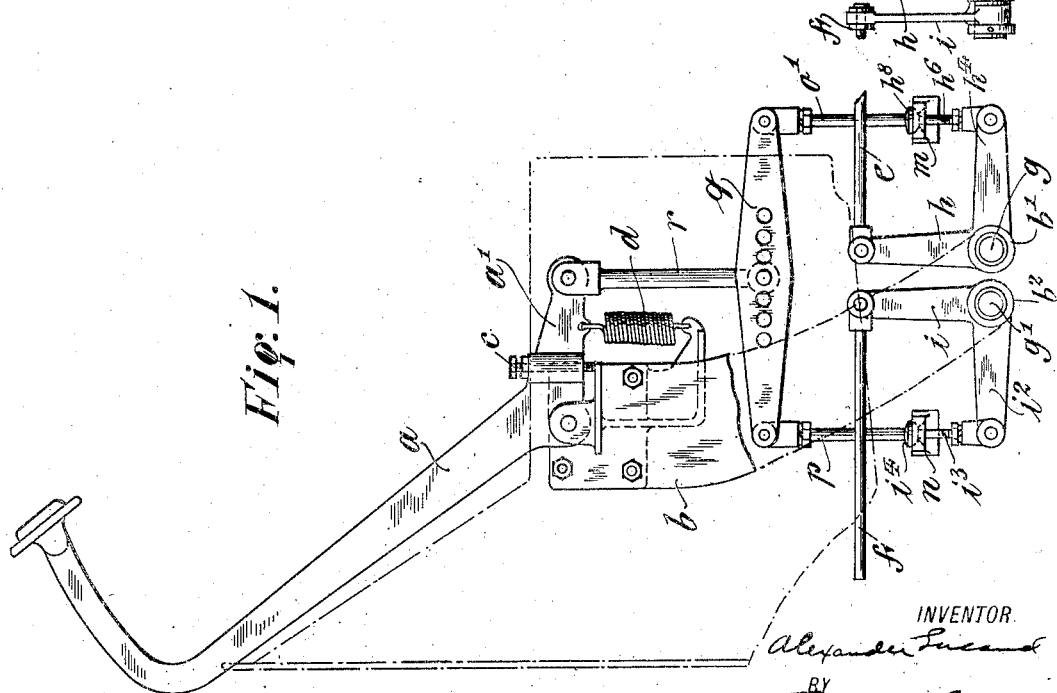
INVENTOR.
Alexander Lucand
BY
Redding Greeley
ATTORNEYS

UNITED STATES PATENT OFFICE.

ALEXANDER LUCAND, OF NEW YORK, N. Y., ASSIGNOR TO INTERNATIONAL MOTOR COMPANY, OF NEW YORK, N. Y., A CORPORATION OF DELAWARE.

FOUR-WHEEL-BRAKE EQUALIZER.

1,379,111.     Specification of Letters Patent.     Patented May 24, 1921.

Application filed March 10, 1920. Serial No. 364,809.

*To all whom it may concern:*

Be it known that I, ALEXANDER LUCAND, a citizen of the United States, whose residence is borough of Manhattan of the city of New York, in the State of New York, have invented certain new and useful Improvements in Four-Wheel-Brake Equalizers, of which the following is a specification, reference being had to the accompanying drawing, forming a part hereof.

This invention relates to a simple and effective device for equalizing braking efforts on all of the four wheels of a motor vehicle in which a brake is provided for each wheel. Devices for equalizing the braking efforts on all of the four wheels of a motor vehicle have never been provided, although efforts have been made to balance somewhat the braking effort supplied to pairs of wheels. The present construction consists generally of a brake pedal connected operatively with separate brake rods for each of the four wheels, equalizing bars being interposed in the connections between such rods and the pedal, so as not only to equalize the braking effort as between any two pairs of wheels, but also to equalize the braking effort of the two wheels of a pair. The devices are simple and efficient mechanically.

Reference is now to be had to the accompanying drawing for a detailed description of one suitable embodiment of the invention, in which—

Figure 1 is a view in elevation of the improved equalizing devices showing their connections to the brake pedal and to the brake rods.

Fig. 2 is a view in rear elevation thereof showing, somewhat diagrammatically, their relation to a portion of the vehicle frame.

The usual brake pedal $a$ is shown as mounted pivotally on a bracket $b$ and as having in its short arm $a'$ a stop screw $c$ by which the effective release of the pedal is adjustably determined. With the arm $a'$ may be engaged a suitable spring $d$ anchored on a portion of the bracket $b$ and adapted to return the pedal to release position. The brake rods for the two rear wheels are indicated in section in Fig. 2 by the reference characters $e$, $e'$ while the brake rods for the two front wheels are shown at $f$, $f'$. The improved devices for equalizing the pressures on all of the four wheels are interposed operatively between the rods $e$, $e'$, $f$, $f'$ and the pedal arm $a'$.

While it will be understood that the actual details of construction of the equalizing devices may be changed by one skilled in the art, as concerns the manner of supporting the various arms and the like and the mechanical connections therebetween, the means shown in Figs. 1 and 2 are suitable for carrying out the principle of the invention. The bracket $b$ has formed in its lower end sleeves $b'$, $b^2$ through which pass rods $g$, $g'$ for supporting the operating arms $h$, $h'$ for the brake rods $e$, $e'$ and the operating arms $i$, $i'$ for the brake rods $f$, $f'_1$, respectively. These supporting rods $g$, $g'$ may find a further bearing support in a depending bracket $k$ secured to one of the side frame members $l$ of the vehicle frame. On the rod $g$ are supported independent sleeves $h^2$, $h^3$, on which are carried the arms $h$, $h'$ respectively. On these sleeves $h^2$, $h^3$ are also carried lever arms $h^4$, $h^5$, respectively, the respective sleeves and arms thus described constituting, in effect, operating bell crank levers. To the lever arms $h^4$, $h^5$, respectively, are pivotally secured rods $h^6$, $h^7$ on the upper ends of which are formed hemispherical knobs $h^8$, $h^9$. The pull rods $h^6$, $h^7$, pass loosely through an equalizer bar $m$ and the knobs $h^8$, $h^9$ seat in hemispherical bearing recesses formed in the upper surface of said bar $m$.

The lever arms $i$, $i'$ for operating the brake rods $f$, $f'$ for the respective brakes of the front wheels may be carried on independent sleeves mounted on a supporting rod $g'$ and having operating arms, one of which is shown at $i^2$ engaged by operating rods, one of which is shown at $i^3$ having hemispherical knobs, such as $i^4$, seating in an equalizing bar $n$ in the precise manner described in connection with the operating attachments for the rear brake rods $e$, $e'$.

The equalizer bar $m$ has formed on its under surface adjacent its mid point a hemispherical seat to receive a hemispherical knob $o$ carried on the lower end of a lifting rod $o'$ which passes loosely through the equalizer bar $m$. The equalizer bar $n$ for the rods $f$, $f'$ is engaged in the same way by a lifting rod $p$. The upper ends of these lifting rods $o'$, $p$ are pivotally secured to the ends of an equalizer bar $q$ which is pivotally joined adjacent its mid-section by a link $r$ to the end of the short pedal arm $a'$.

From the description, the action should be plain. The bar $q$ serves to equalize the braking efforts applied to the two pairs of wheels, in the present case, the front pair being considered as one pair and the rear wheels as the other pair. The equalizer bar $m$ serves to equalize the braking efforts applied to the separate wheels of the rear pair while the equalizer bar $n$ serves to equalize the braking efforts applied to the separate wheels of the front pair. All of the devices are brought into play simultaneously, being all positively, but pivotally, interconnected, and differential pressures required at the different wheels depending upon many factors will be provided automatically and full compensation made in the system for such differential pressures and also for differential travel in any of the parts. The construction is simple and efficient. The release of the brakes is permitted in the usual manner. The rocking movement of the various equalizer bars $q$, $m$ and $n$ permits the devices to adapt themselves to inequalities of pressures and movements and the universal connection between the equalizer bars $m$, $n$ and their respective lift rods $o'$, $p$ and pull rods $h^6$, $h^7$, etc., gives that degree of flexibility but positive transmission which are necessary characteristics of a practical device of this character.

I claim as my invention:

1. Brake operating devices for four wheels, comprising brake rods, independent bell crank levers to which the rods are attached, respectively, a bar for each two bell crank levers having a universal connection therewith, an independent bar for a universal connection with said first named bars adjacent the mid-sections thereof, and means connected pivotally to the last named bar adjacent its mid-section for applying the braking efforts.

2. Brake operating devices for four wheels, comprising brake rods, independent bell crank levers to one of the arms of which the respective rods are attached, sleeves formed integral with each of the levers, rods to support each of the two sleeves for the operating levers for a pair of wheels, rods pivotally connected to the other arm of each of the bell crank levers respectively, hemispherical knobs on each of the last named rods, equalizing bars having seats adjacent their ends for the knobs of each of the rods of a pair of bell crank levers, independent rods having knobs engaging each of said bars adjacent their mid-section, a separate bar connected pivotally at its ends to the two last named rods, and an operating rod connected pivotally to the mid-section of the last named bar.

3. Brake operating devices for four wheels, comprising brake rods, independent bell crank levers to which the rods are attached respectively, a bar for each two bell crank levers having a universal connection therewith, an independent bar having a universal connection with said first named bars adjacent the mid-section thereof, a rod connected pivotally to the last named bar, a brake pedal having an arm connected pivotally to the last named rod, and a spring engaging the brake arm operatively to hold it in released position.

4. Brake operating devices for four wheels, comprising brake rods, independent bell crank levers to one of the arms of which the rods are attached respectively, sleeves formed integral with each of the levers, rods passing through the sleeves of each of two brackets for the operating levers for a pair of wheels, a bracket in which the last named rods are supported, a brake pedal pivoted on said bracket, and equalizing devices interposed operatively between the brake pedal and the bell crank levers to equalize the braking efforts applied to each of the wheels.

This specification signed this 26" day of February, A. D. 1920.

ALEXANDER LUCAND.